Nov. 2, 1937.    E. L. DEARBORN    2,097,452
AUTOMATIC VALVE FOR SPRINKLER SYSTEMS
Filed Aug. 14, 1934    2 Sheets-Sheet 1
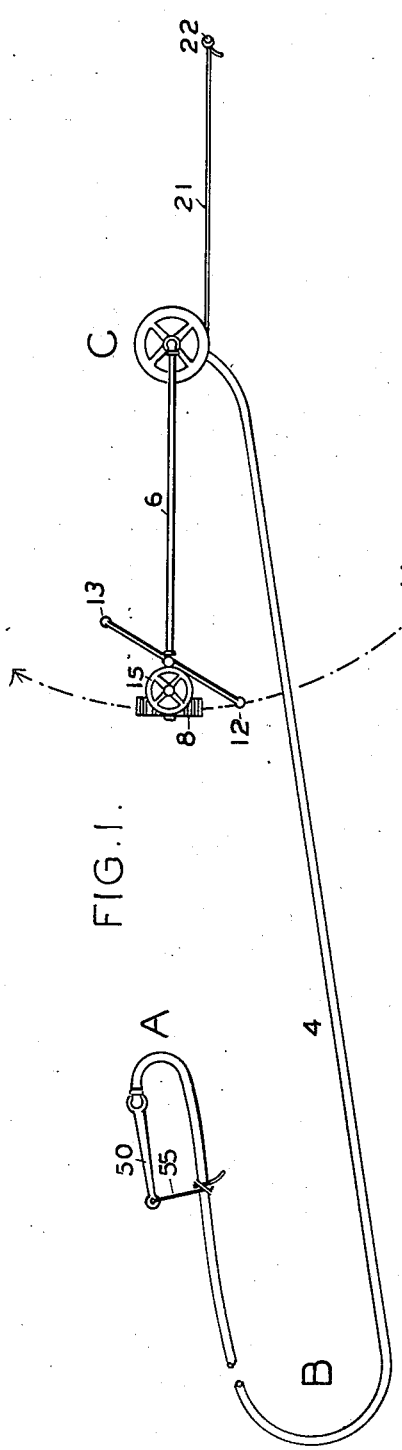
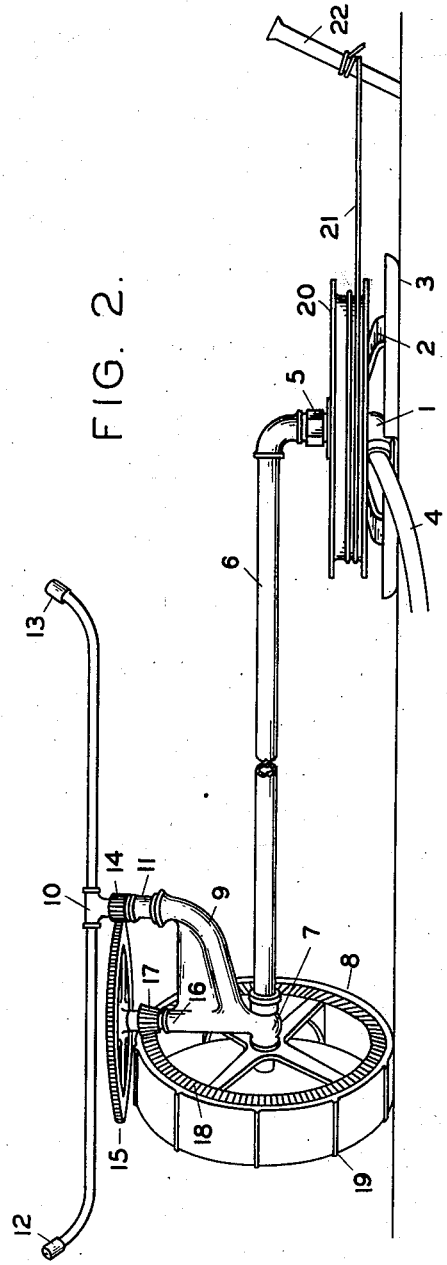
INVENTOR:
EUGENE L. DEARBORN.
BY
ATTORNEY Nov. 2, 1937.  E. L. DEARBORN  2,097,452
AUTOMATIC VALVE FOR SPRINKLER SYSTEMS
Filed Aug. 14, 1934  2 Sheets-Sheet 2
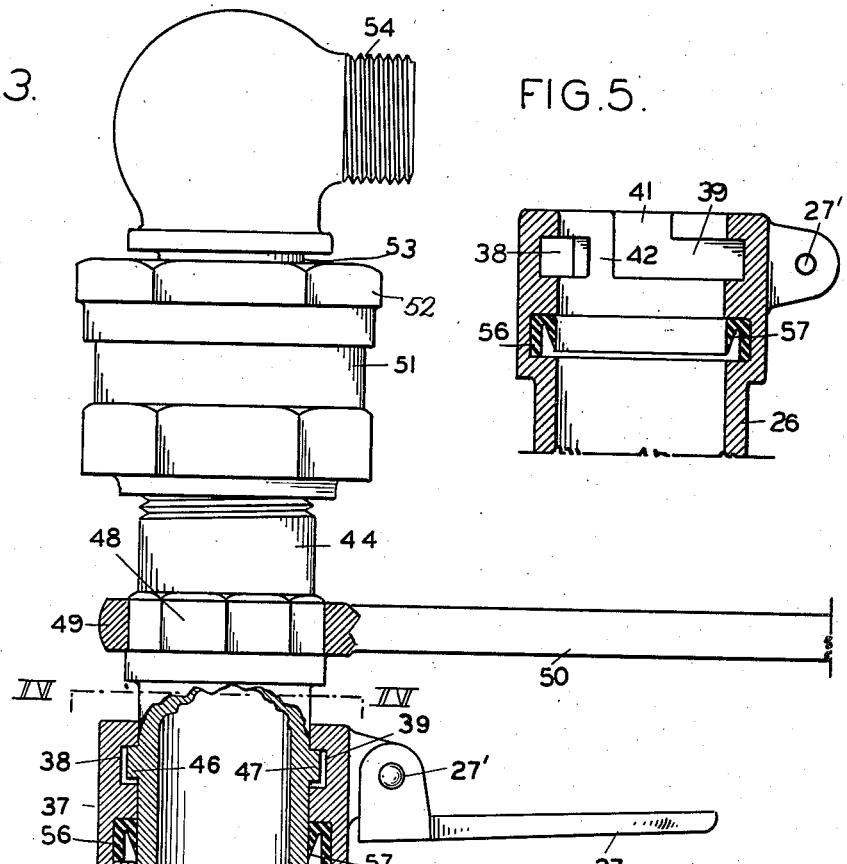
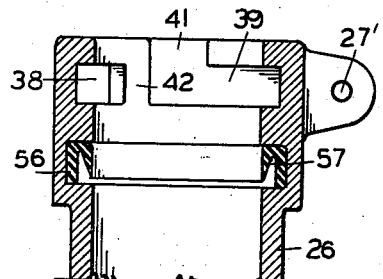
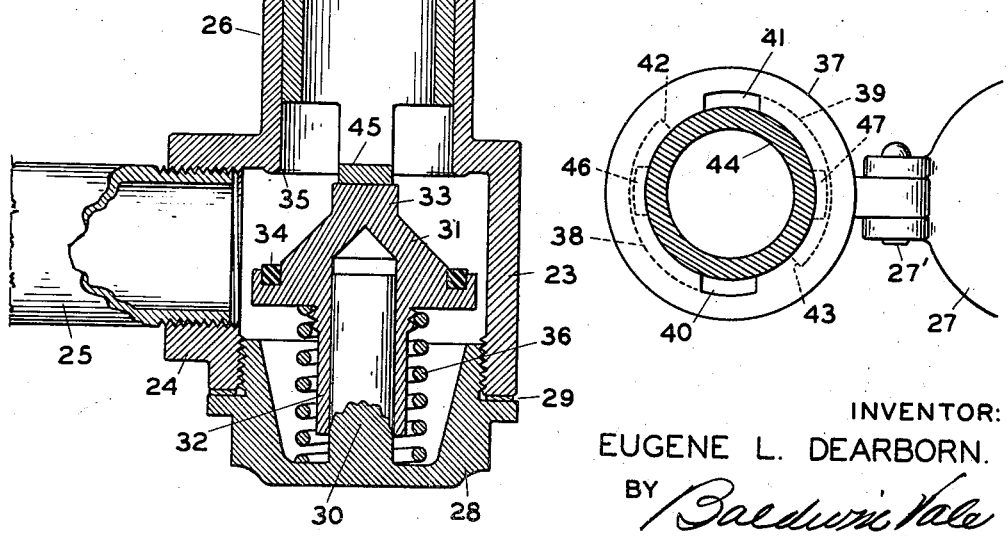
INVENTOR:
EUGENE L. DEARBORN.
BY Baldwin Vale
ATTORNEY Patented Nov. 2, 1937

2,097,452

UNITED STATES PATENT OFFICE 2,097,452

AUTOMATIC VALVE FOR SPRINKLER SYSTEMS

Eugene L. Dearborn, Fairfield, Calif.

Application August 14, 1934, Serial No. 739,793

3 Claims. (Cl. 284—17)

This invention relates to improvements in automatic valves for sprinkler systems and more particularly to a service valve for sprinklers of the traveling type.

Sprinklers of this type include a length of hose fixed at one end to the water service valve. The free end of the hose is attached to a swivel base around which the sprinkler truck travels. See the patents to William C. Todd, et al., dated August 25, 1914, Number 1,108,525 and February 8, 1927, Number 1,616,769, respectively.

More recently there has been added to the above a sheave attached to the swivel in such a manner that it winds up an anchored cable and causes the lineal travel of the pivotal truck.

It is one of the objects of the present invention to shut off the water supply at the service valve when the hose reaches the limit of its length.

Another object is to avoid water pressure in the hose when the sprinkler reaches the end of its travel.

Another object is to render this invention applicable to the conventional sprinklers in the class described.

A further object is to shut off the water supply at any desired distance intermediate the length of the hose.

Other objects and advantages will appear as the description progresses.

In this specification and the accompanying drawings the invention will be disclosed in its preferred form, but it is to be understood that it is not limited to this form because it may be embodied in other forms without departing from the spirit of the invention as defined in the claims following the description.

In the two sheets of drawings:

Fig. 1 is a diagrammatic plan view from above of a conventional sprinkler system having this invention applied thereto.

Fig. 2 is an enlarged side elevation of the traveling sprinkler.

Fig. 3 is a greatly enlarged detail, about full size, in side elevation partially in cross section, of an automatic service valve constructed in accordance with this invention.

Fig. 4 is a fragmentary detail in plan looking into the neck of the valve, and showing the plunger in cross section on the line IV—IV, in Fig. 3.

Fig. 5 is a similar detail in vertical section of the upper portion of the valve neck with the plunger removed.

In detail the construction illustrated in the drawings referring first to Fig. 2 comprises the tubular pivot 1, mounted upon the spider 2, fixed on the circular skid 3. The hose 4 is attached to the pivot 1. The conventional swivel 5 is attached to and rotates upon the pivot 1 and is suitably packed to prevent leakage.

The tubular arm 6 extends between the swivel 5 and the L fitting 7. This fitting has a trunnion thereon, alined with the arm 6 upon which the wheel 8 is mounted to rotate freely. The fitting 7 has the side outlet 9 upon which the rotary spray head 10 is swiveled at 11, all combined and arranged so that water flowing through the hose 4 is delivered through the spray head 10 to cause the same to be rotated by the reaction of the water jetted through the nozzles 12 and 13 in the usual manner.

The pinion 14 is fixed upon the rotating head 10 and enmeshed with the spur gear 15, the shaft of which is mounted in a suitable bearing 16 on the fitting 7. The bevel pinion 17 is fixed upon this shaft and enmeshed with the bevel gear 18 fixed to the periphery of the wheel 8, whereby the rotation of the head 10 is transmitted to the wheel 8 which thus becomes a driven traction wheel, provided with the cleats 19, and adapted to travel around the pivot 1, in a circle $x$, of which the arm 6 is the radius.

The sheave 20 is fixed to the swivel 5, concentric with the pivot 1 and revolves with the arm 6. One end of the cable 21 is fixed to the periphery of the sheave, and the other end is fixed to the anchor pin 22 at a distance slightly greater than the length of the hose 4. The rotation of the sheave winds up the cable 21 and pulls the sprinkler unit toward the pin 22, see Fig. 1. The sprinkler moving forward on the cable drags the length of the hose 4 behind it.

The service valve in accordance with this invention comprises the tubular housing 23, having the side inlet 24 screwed on to the end of the water service pipe 25. The housing has the upstanding tubular neck 26, closed at the top by the flap 27 hinged at 27' to the neck.

The lower end of the housing is closed by the plug 28 screwed thereinto and sealed by the gasket 29. This plug has the guide pin 30 extending upward coaxially with the neck 26.

The automatic valve 31 has the hollow stem 32 slideable on the pin 30 below the head 33. The annular yielding valve insert 34 registers with the annular valve seat 35 surrounding the entrance to the neck 26. The valve is seated by the expansion of the spring 36 compressed between the valve 31 and the plug 28.

In addition to the spring tension the valve is held closed by the water pressure beneath. It is important that there be no leakage through the hose 4 to cause mud puddles at the sprinkler.

The head 37 on the neck has the internal segmental grooves 38 and 39, see also Figs. 4 and 5. The grooves have the vertical openings 40 and 41 and terminate at the stops 42 and 43, respectively.

The hollow plunger 44 is slidable within the neck 26 and has the transverse bridge 45 adapted to engage the head 33 of the valve. It has the external lugs 46 and 47 adapted to enter the openings 40 and 41 and rotate within the grooves 38 and 39 until they are arrested by the stops 42 and 43 forming in effect a "bayonet connection". Thus engaged the valve 31 is depressed and held open by the lugs 46 and 47 until they are restored to registry with the openings 40 and 41.

The plunger 44 has the polygonal portion 48 to receive the wrench 49 having the handle 50. The swivel body 51 is screwed onto the plunger 44 and has the coupling nut 52 threaded thereon and adapted to compress a suitable gland packing around the swivel stem 53 to retain the stem and prevent water leakage at this point, in the usual manner. The stem 53 has the angular head threaded at 54 to receive the hose 4, see Fig. 3.

The hose 4 is arranged in a loop as at A, see Fig. 1. The flexible cord 55 is tied at one end to the end of the handle 50. The opposite end of the cord is fixed to the hose at any desired point, thus in effect shortening the length of hose in operation.

The hose is again looped as at B and extends forward to the sprinkler. When the loop B is straightened out by the pull of the sprinkler and the hose drawn taut, the pull is transmitted through the cord 55 to the wrench which in turn rotates the plunger 44 within the neck 26 and alines the lugs 46 and 47 with their respective openings 40 and 41. Thus freed from the grooves the plunger is released and is forced upward by the spring 36 which also forcibly seats the valve 31 against the seat 35, instantly and completely shutting off the water service through the valve which stops the sprinkler unit.

The polygonal portion 48 provides means for adjusting the handle 50 at any desired radial angle to release the plunger regardless of the radial travel of the sprinkler unit with respect to the service valve.

To prevent surface leakage at the valve, the annular gasket 56 is set in the neck and has the lip 57 surrounding the plunger and forced against it by the internal pressure of the water.

This improvement in valves, makes the operating and stopping of the sprinkler wholly automatic. The progress of the sprinkler is very slow and with a sufficient length of hose it can be operated all night if desired without human attention.

Having thus described this invention what is claimed and desired to secure by Letters Patent is:

1. A valve operating means including a water outlet having a neck; a hollow plunger adapted to enter said neck; a flexible hose attached to said plunger; a bayonet connection between said plunger and neck; a valve in said outlet arranged to be opened by the entry of said plunger into said neck; a spring urging said valve into closed position and urging said plunger outward from said neck and a handle on said plunger arranged to rotate said plunger to release said bayonet connection; a cord having its ends attached to said handle and said hose respectively.

2. A valve operating means including a water outlet having a neck; a hollow plunger adapted to be entered in said neck; a flexible hose attached to said plunger; a travelling sprinkler for moving said hose actuated by the force of the water flowing through the hose; a valve in said outlet arranged to be opened by the entry of said plunger into said neck; resilient means urging said valve into closed position and urging said plunger outward from said neck; retaining means arranged to hold said plunger in said neck against the tension of said resilient means; a handle on said plunger arranged to rotate said plunger and release said retaining means; and a cord having its ends attached to said handle and said hose respectively.

3. A valve operating means including a water outlet having a neck; a hollow plunger adapted to enter said neck; a flexible hose attached to said plunger; a bayonet connection between said plunger and neck; a valve in said outlet arranged to be opened by movement of said plunger in said neck; a spring urging said valve into closed position; a handle on said plunger adapted to move said plunger to open said valve; a cord having its ends attached to said handle and said hose respectively.

EUGENE L. DEARBORN.